US007326315B2

(12) United States Patent
Behnen

(10) Patent No.: US 7,326,315 B2
(45) Date of Patent: Feb. 5, 2008

(54) INTEGRATED CARD AND BUSINESS FORM AND METHOD FOR MAKING SAME

(76) Inventor: David H. Behnen, 670 Goddard Ave., Chesterfield, MO (US) 63005

( * ) Notice: Subject to any disclaimer, the term of this patent is extended or adjusted under 35 U.S.C. 154(b) by 384 days.

(21) Appl. No.: 10/522,999

(22) PCT Filed: Aug. 7, 2003

(86) PCT No.: PCT/US03/24906

§ 371 (c)(1),
(2), (4) Date: Feb. 2, 2005

(87) PCT Pub. No.: WO2004/015656

PCT Pub. Date: Feb. 19, 2004

(65) Prior Publication Data

US 2005/0181167 A1 Aug. 18, 2005

(51) Int. Cl.
*B32B 37/00* (2006.01)

(52) U.S. Cl. .................. 156/253; 156/268; 156/272.2; 156/277

(58) Field of Classification Search ................ 156/257, 156/268, 248, 252, 253, 270, 272.2, 277
See application file for complete search history.

(56) References Cited

U.S. PATENT DOCUMENTS 5,509,693 A 4/1996 Kohls .......................... 283/75
5,837,337 A 11/1998 Schnitzer .................. 428/40.1
6,022,051 A 2/2000 Casagrande ................ 283/107
6,656,555 B1 12/2003 McKillip .................. 428/40.1

*Primary Examiner*—James Sells
(74) *Attorney, Agent, or Firm*—Michael A. Mann; Nexsen Pruet, LLC

(57) ABSTRACT

A card and business form assembly (10) and method for making same. The assembly includes a printable carrier sheet (12) having a card (14) that is releasably attached to the sheet by a backer (16). The method for making this assembly includes introducing a tag web (60) into a printing press; printing indicia (30) on the tag web; applying a first layer of lamination (28) and a second layer of lamination (42) by adhesive means onto bottom surface of the tag stock (18); bonding all the materials including the first and second layers of lamination and the tag web using UV light; cooling the tag web; die cutting the cards; die cutting the backer; forming line feeding holes (109) adjacent to the side edges of the tag web; forming perforations to separate predetermined sections of the tag web; and feeding perforated tag web into a fan fold machine (106) for fan folding into the finished product.

10 Claims, 6 Drawing Sheets

INTEGRATED CARD AND BUSINESS FORM AND METHOD FOR MAKING SAME

BACKGROUND OF THE INVENTION

1. Field of the Invention

The present invention relates generally to identification cards and business forms, and, in particular, to a method for making and die cutting 2. Background of the Art There exist various methods in the art for making business identification cards, such as insurance cards, that are attached to business forms. Typically, the methods include steps of preparing the identification cards separately from the business forms to which the cards are eventually attached. Consequently, most of these methods include multiple presses—wherein one press prepares the identification cards, another press prepares the business forms, and a third press combines the cards and the forms with an adhesive. These methods further include printing and cutting identification cards from rolls of tag stock and applying these cards to predetermined regions on the business forms. Not only do these methods involve a complex array of presses, but they also result in many problems such as the business forms sticking together as a result of ineffective placement of adhesives and laminates.

Preparation of the identification cards and forms further involves the printing of indicia. This information, which includes such items as identification numbers, the name and address of card holder, and policy terms, may be printed on the identification cards themselves or on the forms to which they are attached. Based on the current methods, this step results in various problems. For example, the edges of the cards often become raised from the business forms as they are being fed into the printer. Not only does this occurrence result in damaged cards, but also the printer may become jammed and/or damaged, resulting in further problems and delays. Furthermore, if the adhesive used to attach the cards to the forms was placed on a surface area exceeding that of the business cards, the forms often become stuck together causing further problems and damage to the printing process. Finally, printer flaws are common when the thickness of the identification cards does not equal that of the business forms. If the card has been superimposed on the surface of the carrier sheet, a stacking problem is created in the feed tray of today's high-speed printers because a large number of these sheets when stacked have a tendency to fall over or create an uneven stack due to the uneven surface area of the cards.

Although there have been improvements made to the above-cited problems, disadvantages still exist with the current methods. McKillip, U.S. Pat. No. 5,462,488, shows an example of such an improvement. Generally, the card assembly disclosed by McKillip consists of four layers: upper material, lamina, removable adhesive, and lower material. A die-cut extends from the upper material through the removable adhesive, defining the shape of the card. This assembly is an improvement over the prior art in that the cards are substantially co-planar with their surrounding border thereby reducing many of the problems associated with the printing and stacking of the card forms. However, the card assembly is still problematic when it is fed into standard printers and business equipment because of its thickness, as well as its adhesive materials. For example, when going through high speed or high heat printers, a percentage of the cards will separate or peel from the forms. The final card assembly is also difficult to fan-fold for convenient storage. Further, the coating tends to separate from the paper when the cards are removed from the forms.

There exists a need for an improved identification card and business form assembly and more simplified method for making business identification forms that will avoid the problems faced by the current methods. The instant invention meets this need, and provides an improved integrated card and business form.

SUMMARY OF THE INVENTION

According to its major aspects and briefly stated, the present invention is generally an integrated insurance identification card and business form and a method for making the same.

In particular, the integrated insurance card and business form includes a printable carrier sheet having cards that are releasably attached to a backer on the sheet. The carrier sheet is made of a layer of tag stock having a top surface and a bottom surface. On the top surface of the tag stock is a layer of coating and printed indicia. The bottom surface of the tag includes a first layer of UV curable adhesive that adheres a first layer lamination to the tag stock and further printed indicia. The bottom surface further includes a second layer of UV curable adhesive over the first layer of lamination. This adhesive layer forms the intermediate layer between the first layer of lamination and a second layer of lamination. For the purposes of the present invention, the term "UV curable" refers to materials that are activated through the use of ultra violet rays or light. The identification cards are formed by die cutting the dimensions of the cards through both sides of the tag stock and through the first layer of lamination. The tag stock further includes a backer that is formed by die cutting the shape of the backer through the first and second layers of lamination. The die cut identification cards are carried by and are releasably attached by the backer to the surrounding tag stock border or business form. The backer further includes printed indicia.

The present invention further includes method for making and die cutting the insurance identification cards and business forms including the following steps: 1) introducing a layer of tag stock having a coated top surface and an uncoated bottom surface into a printing press so that indicia can be printed on the coated surface of tag stock; 2) printing indicia on the coated surface of the tag stock; 3) turning the tag stock so that indicia can be printed on the uncoated surface of the tag stock; 4) applying a first layer of lamination by adhesive means onto the uncoated surface of the tag stock; 5) bonding the adhesive and laminate to tag stock using ultraviolet (UV) light; 6) applying a second layer of lamination onto the first layer of lamination by adhesive means; 7) bonding all the materials including the first and second layers of lamination and the tag stock using UV light; 8) cooling the tag stock; 9) die cutting the cards through the tag stock and through the first layer of lamination; 10) die cutting the shape of a backer through the two lamination layers; 11) printing indicia on the backer; 12) removing waste materials from the surface of the tag stock for disposal; 13) forming line feeding holes adjacent to the side edges of the tag stock; 14) forming perforations to separate predetermined sections of the tag stock; and 15) feeding perforated tag stock into a fan fold machine for fan folding into the finished product.

An important feature of the present invention is the use of the coated tag stock. The top surface of the tag stock is coated with clay to give a higher gloss to the tag. Further, the clay coating blocks the absorption of ink by the tag. This feature gives the tag stock better printability and appearance than a non-coated material.

Another important feature of the present invention is the use of a high-density tag stock. Tag and board stocks are generally very porous materials, which allow absorption of inks into the material. The tag stock used in the present invention is manufactured to a density higher that normal for such applications. This feature insures that the adhesive, which is applied to the uncoated side of the paper, does not soak into the paper. Therefore, a solid bond of the lamination to the tag stock results. Further, the density feature prevents the absorption of inks into the tag stock, which contributes to the better printability and appearance of the insurance identification cards and forms.

Yet another important feature of the present invention is the use of a backer on the bottom surface of the tag stock. The backer, which includes the second layer of lamination and the fugitive adhesive, acts as a carrier for the finished identification cards. The adhesive of the backer is pressure sensitive so that the cards are not permanently adhered to the backer and can be removed without accumulating any residue or tackiness. The use of the backer is an improvement over the prior art in that the backer does not increase the overall thickness of the tag stock. Further, the backer extends over only the portion of the tag stock that will include the cards. Accordingly, this feature reduces many of the feeding and printing problems faced by the prior art.

Still another important feature is the use of a layer of hold out adhesive on the bottom surface of the tag stock. “Hold out” is a term for UV curable inks and adhesives. Hold out prevents the ink or adhesive from diving or soaking into the tag stock being printed. For the purposes of the present invention and the following detailed description and claims, hold out adhesive is the adhesive that is applied to the uncoated bottom surface of the tag stock. Hold out adhesive is formulated to help prevent any absorption or diving into the uncoated bottom surface of the tag stock. This feature, along with the density of the tag stock, creates a superior bond between the first layer of lamination and the tag stock. Further, this feature enhances the printability and appearance of the coated top surface of the tag stock because the adhesive does not soak through the tag stock.

A further feature of the present invention is the use of the first layer of lamination. The first layer of lamination is treated on one side so as to allow the hold out adhesive to adhere the first layer of lamination and the tag stock to form a permanent bond. Preferably, the lamination layer is made of polypropylene film that is a thickness that is optimal to the present application. The untreated side of the first layer of lamination allows the fugitive adhesive to only releasably adhere the second layer of lamination to first layer of lamination and not form a permanent bond. Accordingly, cards may be detached from the carrier sheets without accumulating or bearing any tackiness.

Another feature of the present invention is the use of a flexographic press that is specifically adapted for the method of making the identification cards. Among the various adaptations, the press includes nip rolls, a turn bar, laminating towers, and a cold air system. The nip rolls are designed to control the tensions from the in feed of the press, as well as the overall path of the tag and laminate webs. This feature helps to improve the quality of the printing and lamination of the cards and business forms. The turn bar is specially designed to handle light tag to heavy board stocks. Consisting of idlers and slant bars, the turn bar allows for a smooth transition of the tag web when it is being turned to print on the opposite side. As those skilled in the art know, the term “web” refers to a large continuous roll of tag stock that is fed into the printing press. The laminating towers enable precise control of the tensions of the layers of laminate. Finally, the cold air system, which is installed just after the laminating towers and at the first die cut in the process, cools the web and keeps the layers on the tag stock stable. This feature insures that there is a stable surface on the tag stock against which to die cut.

Still another feature of the present invention is the use of certain lamination films in combination with UV curable adhesives. This combination creates a strong bond of the materials, allowing the insurance card form to be fan-folded at the perforations without the risk of a premature fold at the die-cut. This feature further allows the cards to be removed from the finished forms without adhesive residue or tag stock separation.

Yet another feature of the present invention is the use of pattern coating to apply the first layer of adhesive. The term “pattern coating” refers to the application of adhesive onto the tag stock using a specific pattern so that the lamination only adheres to the pattern of the adhesive and not to the rest of the tag stock. In particular, the pattern coating includes the area on the tag stock that contains the backer. Accordingly, after the backer of the insurance card form has been die cut, a waste matrix is formed that includes the first and second layers of lamination, and the second layer of adhesive. This result is advantageous because the tag stock is left free from lamination and adhesive layers. Therefore, the perforations, and feed hole formation becomes more precise. This result is significant because the ability to fanfold the finished insurance card form, as well as feed the form into standard printers, is greatly enhanced. Further, the use of the pattern coating alleviates the need for adhesive deadener. The term adhesive deadener refers to a material, such as silicone, placed between two other materials that hinders, inhibits or neutralizes their adhesion.

These and other features and their advantages will be apparent to those skilled in the art of manufacturing card and business form assemblies from a careful reading of the Detailed Description of Preferred Embodiments, accompanied by the following drawings.

DETAILED DESCRIPTION OF A PREFERRED EMBODIMENT

The present invention is an integrated insurance identification card and business form assembly and a method for making the assembly. Although the integrated card and business form assembly and method for making same will be described herein with respect to insurance cards, those skilled in the card manufacturing arts will readily appreciate the adaptability of the present insurance card and method to other types of identification cards and business forms.

Figure 1:
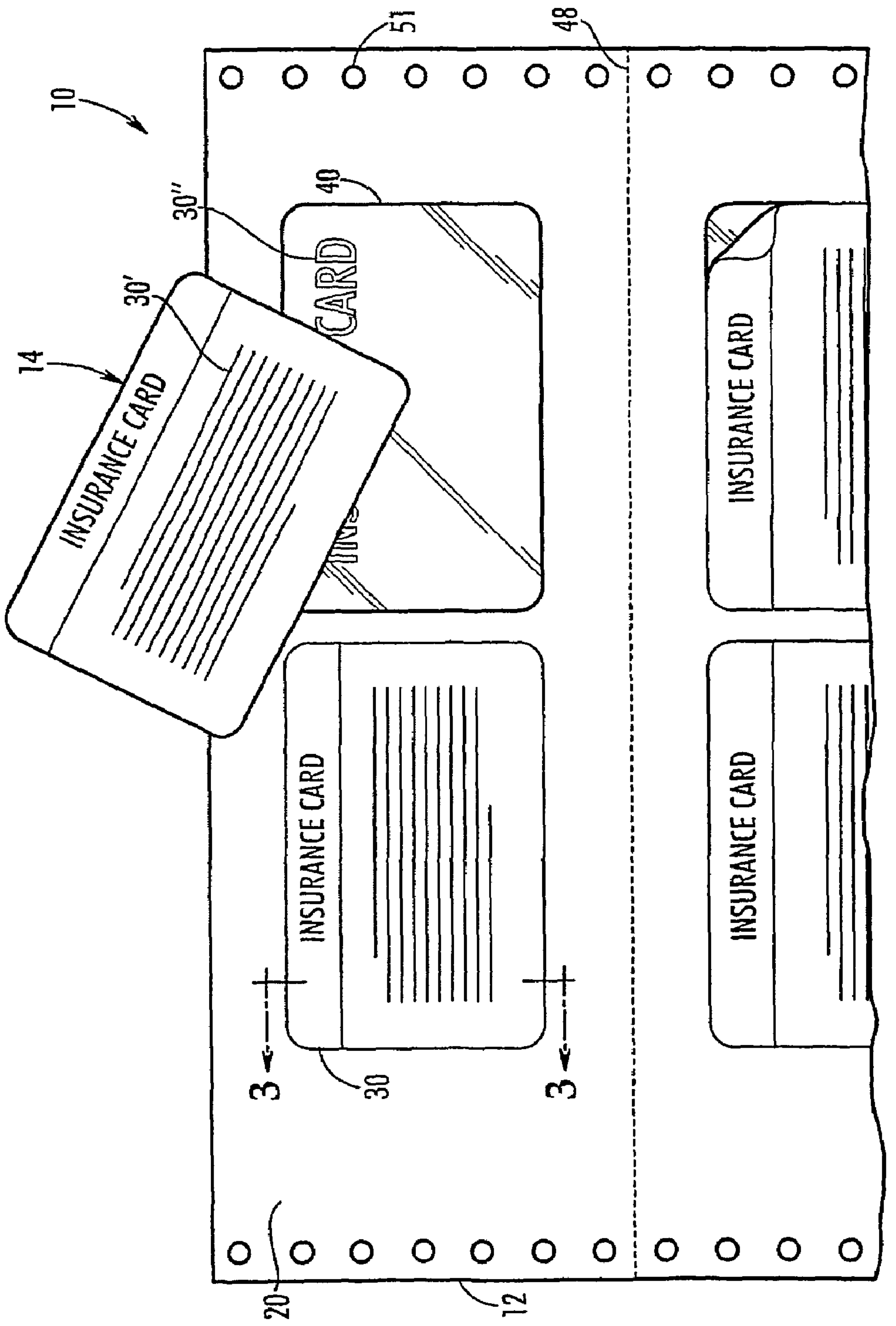
FIG. 1 is a front view of a card and business form assembly, including a printable carrier sheet having cards that are releasably attached to a backer on the sheet according to a preferred embodiment of the present invention.
Figure 2:
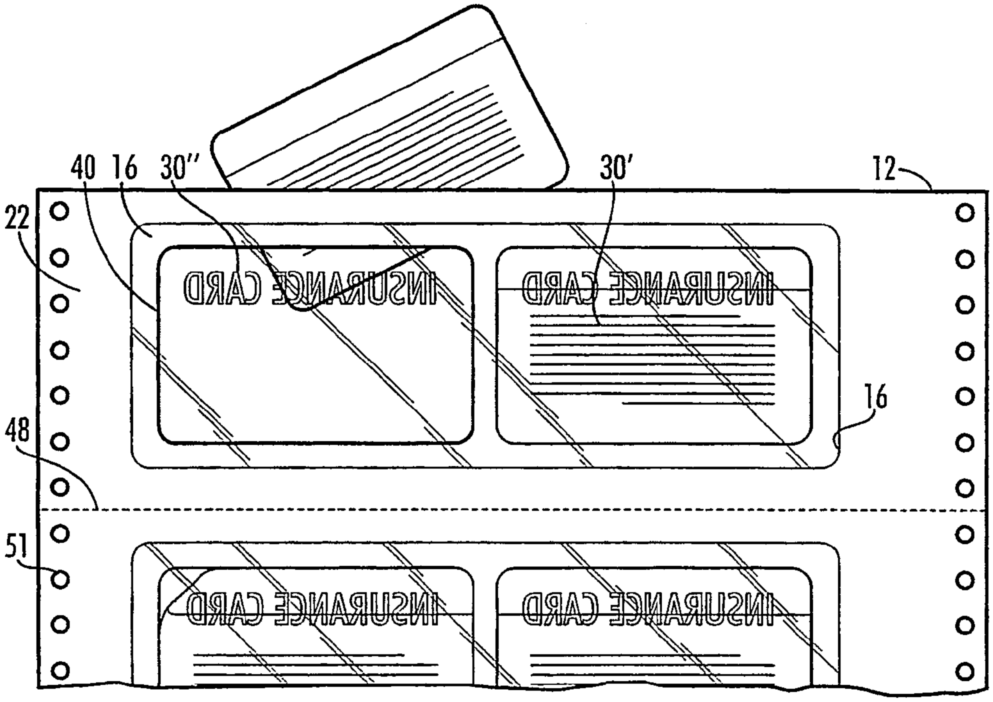
FIG. 2 is a rear view of a card and business form assembly including a printable carrier sheet having cards that are releasably attached to a backer on the sheet according to a preferred embodiment of the present invention.

Referring now to the figures, the integrated insurance card and business form assembly is shown. The assembly is generally indicated by reference number 10. The front and rear views of assembly 10 are illustrated in FIGS. 1 and 2, respectively. As shown in FIG. 1, integrated insurance card and business form assembly 10 includes a printable carrier sheet 12 having insurance cards 14 that are releasably attached to carrier sheet 12, and a surrounding border region 40, which surrounds adjacently positioned cards 14. The cards 14 are attached to carrier sheet by a backer 16, as shown in FIG. 2.

Figure 3:
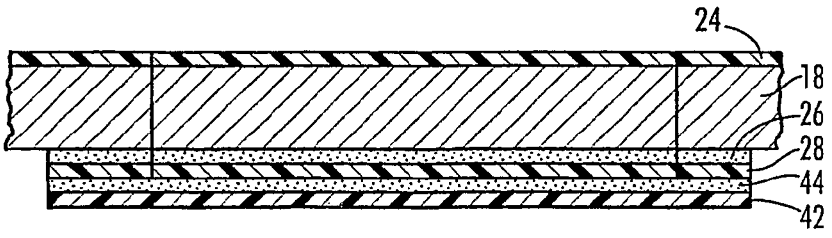
FIG. 3 is cross-sectional view illustrating layers of a card and business form assembly, with thickness exaggerated, according to a preferred embodiment of the present invention.
Figure 5B:
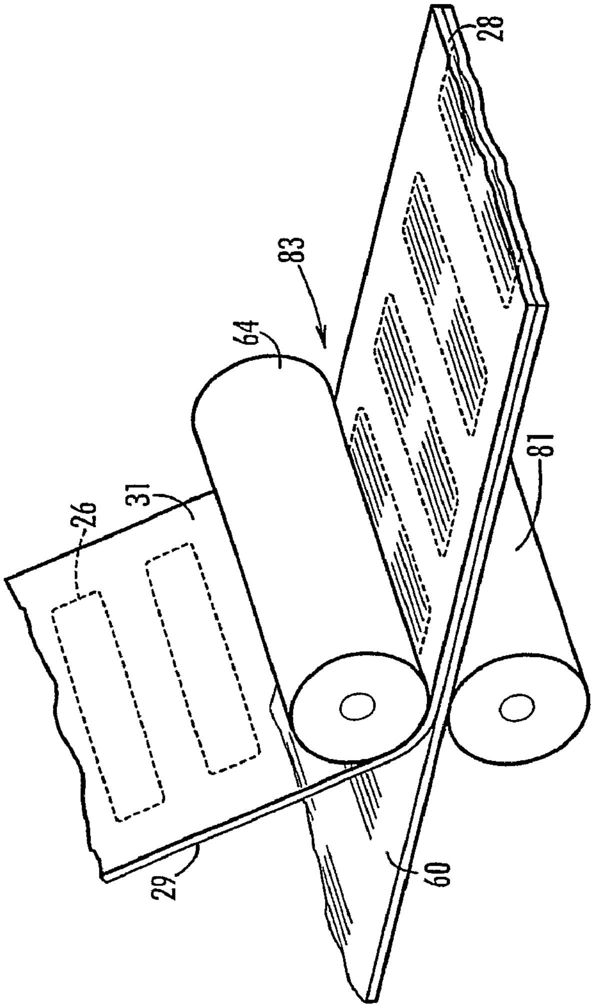
FIG. 5B is a top perspective view of the first laminate applicator of FIG. 4, showing, in particular, the application of a first layer of lamination according to a preferred method of the present invention.
Figure 5A:
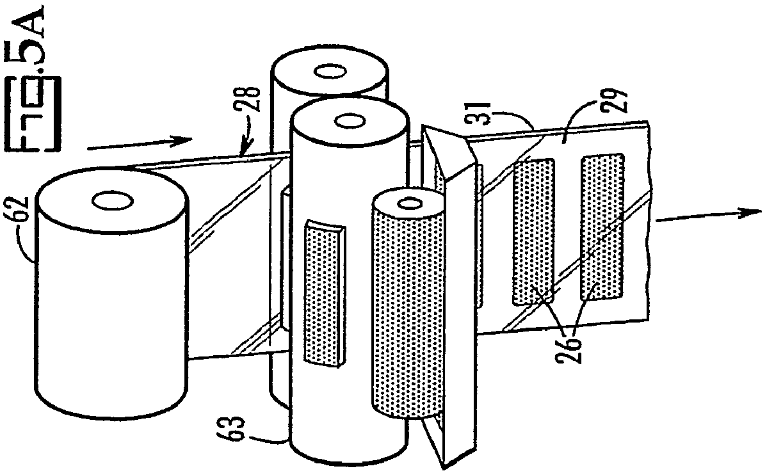
FIG. 5A is a front perspective view of the first adhesive applicator of FIG. 4, showing, in particular, the application of the first adhesive layer according to a preferred method of the present invention.

The various layers of the assembly are illustrated in FIG. 3. As shown, carrier sheet 12 includes a layer of tag stock 18 having a top surface 20, which is shown in FIG. 1, and a bottom surface 22, as shown in FIG. 2. The carrier sheet 12 further includes a layer of hold out adhesive 26 and a first layer of lamination 28 having a bottom surface 29 and a top surface 31. The bottom surface 29 and top surface 31 of first lamination layer 28 are shown in FIGS. 5A and 5B, respectively. The backer 16 of assembly 10 includes a second layer of lamination 42 and a second layer of adhesive 44.

Perforation means 48 and printer guides 51 along the side edges of carrier sheet 12 are further included in assembly 10 and are illustrated in FIGS. 1 and 2. The perforation means 48 facilitate both the folding and the separation of the assembly 10. The printer guides 51 facilitate the feeding of the assembly 10 into standard printing and business equipment.

Although other types of tag stock 18 or board stock may be used to make integrated insurance card and business form assembly 10, 8 point (pt.) C1S light tag is used in the preferred embodiment. The 8 pt. tag is a designation of thickness (weight) of tag stock 18. As stated above, a particular feature of the present invention is the use of a high-density tag stock. The tag stock 18 used in the present invention is manufactured to a density higher that normal for such applications. This density feature prevents the absorption of inks into the tag stock, which contributes to an improved printability and appearance of the insurance cards and forms.

On the top surface 20 of tag stock 18 is a layer of coating 24, showing in FIG. 3, which is pre-applied, and printed indicia 30. The bottom surface 22 of tag stock 18 is uncoated and includes further printed indicia 30'. The printed indicia 30 may include such non-variable information as a company name, as well as variable information such as name, address, policy number, and coverage information. Preferably, the layer of coating 24 on tag stock 18 is a type of clay coating, which is a particular feature of the present invention. As previously discussed, the clay coating gives a higher gloss to the tag stock 18. Further, the coating insures blocks the absorption of ink into the tag stock 18. This feature gives the tag stock 18 better printability and appearance than a non-coated material.

On the bottom surface 22 of the tag stock is the layer of hold out adhesive 26 and the first layer of lamination 28. Hold out adhesive layer 26 is operably applied to the bottom surface 29 (shown in FIG. 5A) of lamination layer 28 by means such as pattern coating before application of the laminate to the tag stock 18. The layer of lamination 28 is then adhered to the bottom surface 22 of tag stock 18 by layer of hold out adhesive 26 and forms a permanent bond with the tag stock 18. Preferably, the bottom surface 29 of the lamination layer 28 is treated with corona treatment, so that the hold out adhesive layer 26 will adhere to the laminate. Corona treatment is a static charge that is applied directly onto the lamination material. Although the lamination material is preferably a type of plastic film, such as polypropylene film, different types of lamination, such as polyester, of varied thickness are contemplated depending on the type of tag or board stock that is used for the integrated card and business form assembly 10.

As previously discussed, particular features of the present invention include the use of hold out adhesive layer 26 and first layer of lamination 28 that is coated on one side. The use of the first layer of lamination 28 having coating on the bottom surface 29 helps the hold out adhesive layer 26 to adhere to the first layer of lamination 28 and to the tag stock 18 and form a permanent bond. The top surface 31 of the first layer of lamination 28 remains untreated so as to allow the backer 16 of the integrated insurance card and business form assembly 10 to only releasably adhere the cards of the assembly 10 to the carrier sheet 12 and not form a permanent bond. Accordingly, cards 14 may be detached from the carrier sheets 12 without accumulating or bearing any tackiness. Further, The hold out adhesive layer 26 is formulated to help prevent any absorption of adhesive or diving into the uncoated bottom surface 22 of the tag stock 18 by the adhesive. This feature along with the density of the tag stock 18 and tag coating 24 helps to create a solid bond between the first layer of lamination 28 and the tag stock 18. Finally, the overall appearance of the cards and business forms is improved because of the resulting higher gloss and better printability of the cards and business forms.

Yet another feature of the present invention is the use of pattern coating to apply the hold out adhesive layer 26. The term "pattern coating" refers to the application of adhesive onto the tag stock 18 using a specific pattern so that the first layer of lamination 28 only adheres to the pattern of the adhesive and not to the rest of the tag stock 18. The use of the pattern coating alleviates the need for adhesive deadener. The term adhesive deadener refers to a material, such as silicone, placed between two other materials that hinders, inhibits or neutralizes their adhesion. The less materials that are used on the surface of the tag stock 18, the more precise are the perforations and cuts that are introduced into the tag stock 18. Accordingly, the ability to fan fold and feed the finished insurance card forms becomes enhanced.

Generally rectangular cut lines 32 define the perimeters of the insurance cards 14. The cut lines 32 extend through carrier sheet 12, including the tag stock 18 and first layer of lamination 28, and are preferably formed by standard methods of die cutting. However, other types of cut lines may be used, such as intermittent or perforated cut lines. As shown in FIGS. 1 and 2, insurance cards 14 are releasably attached to backer 16 and may be peeled away from surrounding border region 40, which may include business form information, by lifting an edge or corner of the card 14 until the card 14 is removed from carrier sheet 12. Insurance cards 14 and surrounding border region 40 are substantially co-planar with each other so as to reduce the various problems associated with the printing of the cards 14 that are positioned above or below the top surface of the surrounding border region 40.

Backer 16 of integrated insurance card and business form assembly 10 is shown in FIGS. 2 and 3 and includes second layer of lamination 42 having a bottom surface 41 (FIG. 6A) and a top surface 43 (FIG. 6B) that is applied to the untreated side of first layer of lamination 28 by layer of pressure sensitive adhesive 44. Pressure sensitive adhesive layer 44 is operably applied to the bottom surface 41 of second layer of lamination 42. Second layer of lamination 42 is then adhered to untreated top surface 31 of first layer of lamination 28 by adhesive layer 44, which creates a fugitive bond between first layer of lamination 28 and second layer of lamination 42. Although other types of adhesives standard in the art of card assemblies may be employed, pressure sensitive adhesive layer 44 is preferably made of materials such as acrylic-based adhesive or rubber-based adhesive. In the context of this detailed description and the following claims, "fugitive bond" refers to the ability of the pressure sensitive adhesive layer 44 to allow second lamination layer 42 to be removed from the first layer of lamination 28 without leaving any adhesive residue or tackiness on the first layer of lamination 28. The second layer of lamination 42 is preferably a plastic film, such as polypropylene film, and is preferably 0.001 mil, or one thousandths of an inch, thick. However, other types of lamination, such as polyester, having varied thickness are contemplated for use.

Preferably, the both adhesion layers are UV curable. The term UV curable refers to materials that are activated, and, in the present invention, acquire the ability to adhere, through the use of ultraviolet light or rays. As previously discussed a particular feature of the present invention is the use of certain lamination films in combination with UV curable adhesives. This combination creates a strong bond of the materials, allowing the insurance card form to be fanfolded at the perforations without the risk of a premature fold at the die-cut. This feature further allows the cards to be removed from the finished forms without adhesive residue or tag stock separation.

As shown in FIG. 2, generally rectangular cut lines 46 define the perimeters of backer 16. The cut lines 46 extend through first and second layers of lamination 28 and 42, respectively, and are preferably formed by standard methods of die cutting. However, other types of cut lines may be used, such as intermittent or perforated cut lines. Further printed indicia 30" (FIGS. 1 and 2) may be included on backer 16. For example, printed indicia 30" stating prerequisites for insurance coverage may be added to backer 16.

The use of backer 16 on carrier sheet 12 is a particular feature of the present invention. The backer 16 acts as a carrier for the finished insurance cards 14. Further, the adhesive layer 44 of the backer 16 is pressure sensitive so that the cards 14 are not permanently adhered to the backer 16 and can be removed without accumulating any residue or tackiness.

As previously discussed, the use of pattern coating to apply hold out adhesive layer 26 to tag stock 18 is also a feature of the present invention. In particular, the pattern coating includes the area on the tag stock 18 that contains the backer 16. As shown, backer 16 only extends over the portion of the tag stock 18 that includes the insurance cards 14. Accordingly, after the backer 16 of the insurance card form has been die cut, a waste matrix is formed that includes the first and second layers of lamination 28, 42, and the second layer of adhesive 44. This result is advantageous because the tag stock 18 is left free from lamination and adhesive layers. Therefore, the perforations, and feed hole formation becomes more precise. This result is significant because the ability to fanfold the finished insurance card form, as well as to feed the form into standard printers, is greatly enhanced.

Figure 4:
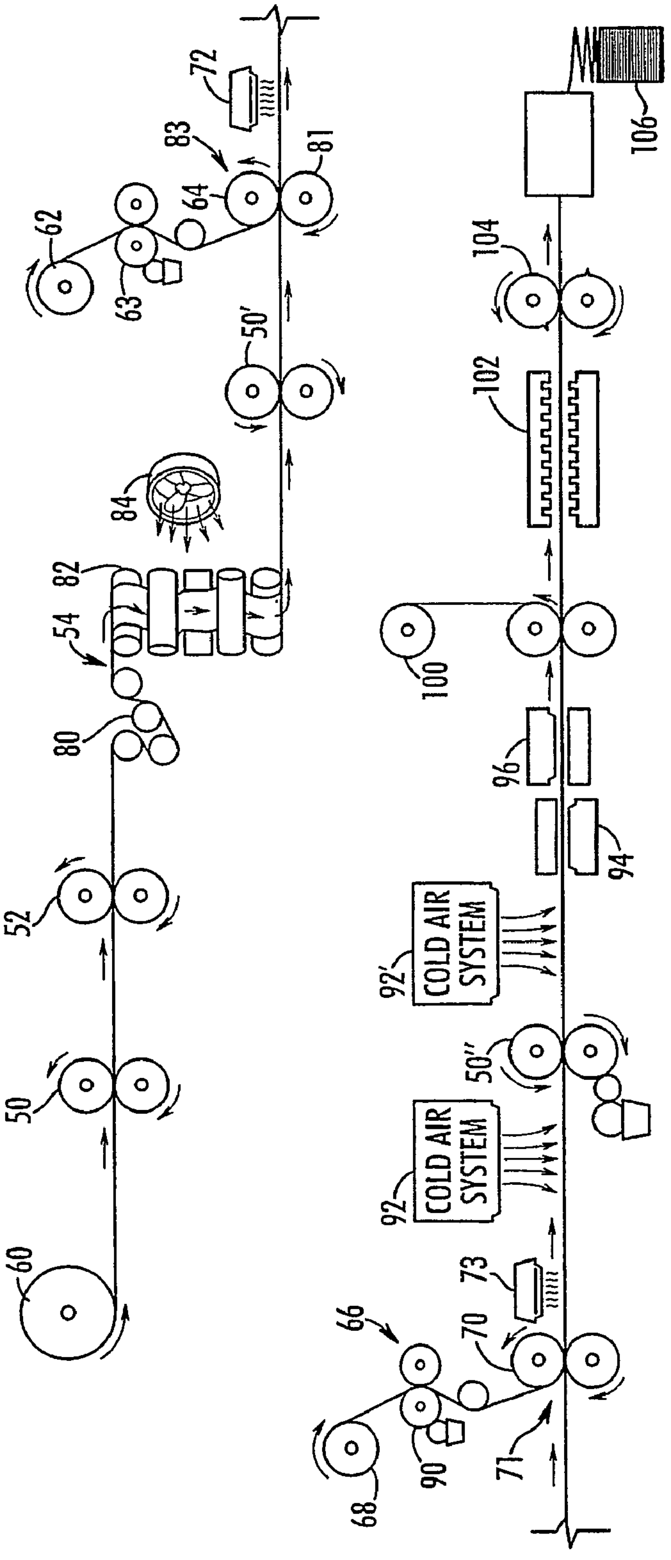
FIG. 4 is a schematic diagram illustrating a method of manufacturing a card and business form assembly including a printable sheet having cards that are releasably attached to a backer on the sheet according to a preferred method of the present invention.

A method for making integrated card and business form assembly 10 on a card formation machine, and preferably a flexographic press, is shown in a schematic diagram in FIG. 4. The method is initiated by introducing a tag web 60, preferably made of 8 pt. tag stock 18 having a coated top surface 20 and an uncoated bottom surface 22, into a flexographic printing press so that indicia can be printed on the coated top surface 20 of tag stock 18. The layer of coating 24 on the tag stock 18 is pre-applied, and is preferably a type of clay coating. As stated above, the density of the tag stock 18 and the tag coating 24 are particular features of the present invention because they insure that the adhesive, which is applied to the uncoated bottom surface 22 of the tag stock 18, does not dive or soak the tag stock 18. Therefore, a solid bond is formed between the laminate and tag stock 18 and the top surface 20 of the tag stock 18 has better printability and appearance.

The tag web 60 next proceeds through print stations of the press including printing rollers 50 for the printing of indicia on the top surface 20 of the tag stock 18. Once the printing on the top surface 20 of the tag stock 18 has been completed, the tag web 60 enters an isolation nip roll 52 that is directly in front of a turn bar 54. The isolation nip roll 52 is designed to control the tensions from the in feed of the press up to the turn bar 54. This feature helps to improve the quality of the printing of the top surface 20 of the tag stock 18.

After exiting the isolation nip roll 52, the tag web 60 is turned by turn bar 54 and enters additional print stations including print rollers 50' for the printing of indicia on the bottom surface 22 of the tag stock 18. The turn bar 54, which is designed to handle light tag to heavy board stocks, preferably includes 5" idlers 80 and 5" slant bars 82 to have a smooth transition of the tag web 60 when it is being turned to print the opposite side of the tag stock 18. In operation, turn bar 54 uses 100 cfm (cubic feet per minute) of air from an air source 84, preferably, an air compressor, to float the tag web 60 over the slant bars so as to reduce the friction between the tag web 60 and the bars.

Once the printing on the uncoated bottom surface 22 of the tag stock 18 is completed, the tag web 60 passes through a first laminating tower 62 for the application of first lamination layer 28. The first layer of lamination 28 is applied to the bottom surface 22 of the tag stock 18 by means of first layer of adhesive 26. As shown in FIG. 5A, adhesive layer 26 is preferably pattern coated on the bottom surface 29 of the first layer of lamination 28 using a first adhesive applicator 63. First layer of lamination 28 is then applied to the tag web 60 directly after the application of the adhesive layer 26. The lamination layer 28 is fed from the first laminating tower 62, which enables the precise control of the tensions of the laminate, and is applied to the tag stock 18 using a first laminate applicator 83, such as a movable nip roll 64 and idler 81. As shown in FIG. 5B, the movable nip roll 64 of first laminate applicator 83 allows for further control of the tensions and pressures of the laminate to insure a superior bond between the first lamination layer 28 and the tag stock 18. Although the lamination material used is preferably a polypropylene film, different types of lamination of varied thickness are contemplated for use.

As previously discussed, the use of hold out adhesive and laminate having a treated surface is a particular feature of the present invention. The bottom surface 29 of first layer of lamination 28 is preferably treated with corona treatment so that the adhesive layer 26 will adhere the laminate to the tag stock 18. Preferably, adhesive layer 26 is a type of hold out adhesive, or UV curable adhesive. The hold out adhesive helps to prevent any absorption of the adhesive or diving into the uncoated surface 22 of the tag stock 18 by the adhesive.

Once the first layer of lamination 28 has been applied, the tag web 60 travels through a first UV lamp 72 for the bonding of the applied materials, including the adhesive and lamination layers 26 and 28, respectively, to the bottom surface 22 of the tag stock 18. Preferably, a permanent bond is formed between first layer of lamination 28 and tag stock 18.

The tag web 60 next travels through a second laminating tower 68 for the application of second lamination layer 42. The second layer of lamination 42 is applied to the top surface 31 of first lamination layer 28 by means of second layer of adhesive 44. The top surface 31 of the first lamination layer 28 preferably remains untreated so as to prevent the formation of a permanent bond between first layer of lamination 28 and second layer of lamination 42.

Figure 6B:
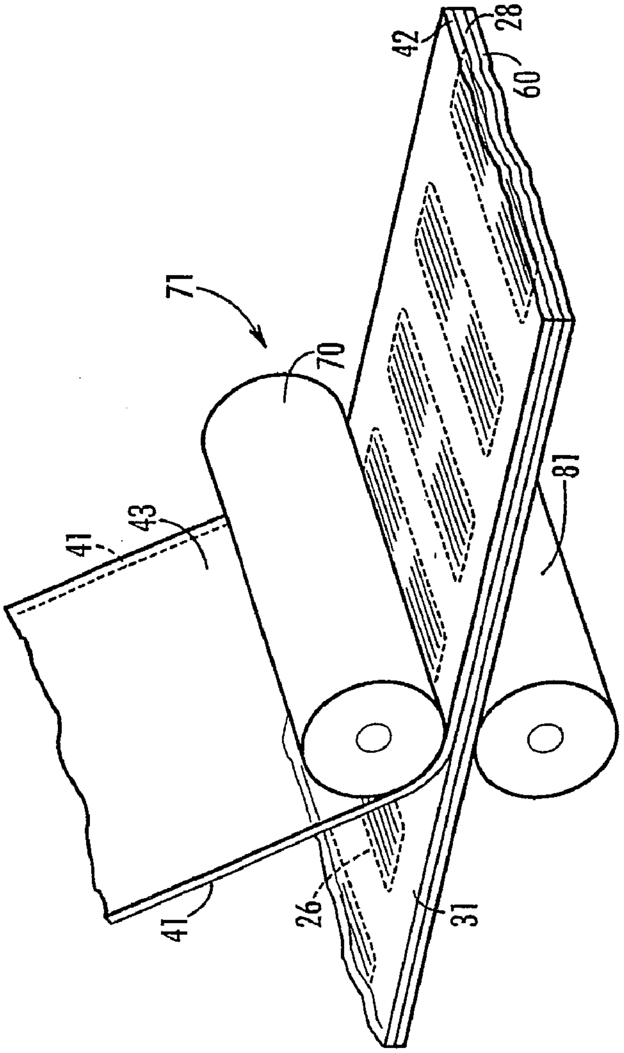
FIG. 6B is a top perspective view of the second laminate applicator of FIG. 4, showing, in particular, the application of the second layer of lamination according to a preferred method of the present invention.
Figure 6A:
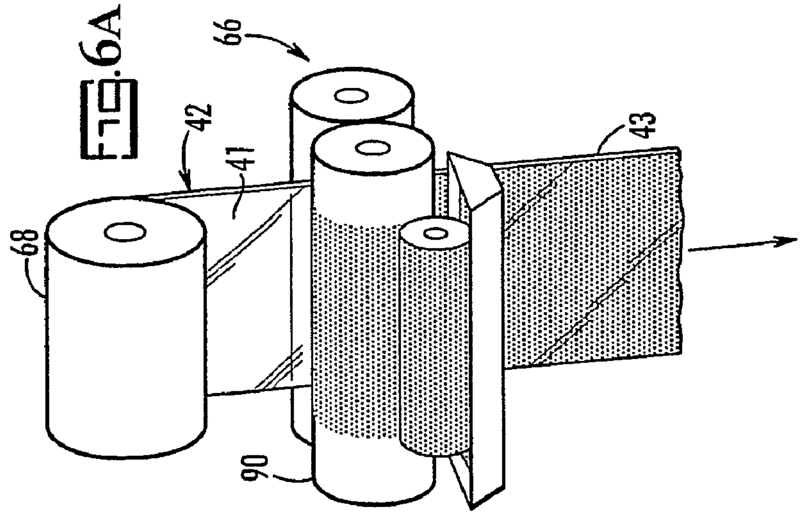
FIG. 6A is a front perspective view of the second adhesive applicator of FIG. 4, showing, in particular, the application of the second adhesive layer according to a preferred method of the present invention.

To initiate the application of the second lamination layer 42, second layer of adhesive 44 is first applied to the bottom surface 41 of second lamination layer 42 using a second adhesive applicator 66. As illustrated in FIG. 6A, the adhesive is preferably applied to the laminate using an anilox roll 90, which controls the thickness of the adhesive layer 44 thereby insuring a proper bond between first layer of lamination 28 and second layer of lamination 42. Directly after the application of the adhesive layer 44, second layer of lamination 42 is applied to the top surface 31 of first layer of lamination 28. The lamination layer 42 is fed from the second laminating tower 68, which enables the precise control of the tensions of the laminate, and is applied to the tag web 60 by means of a second laminate applicator 71, such as a rubber tint sleeve 70 (FIG. 6B). By wrapping the laminate around the tint sleeve 70 and applying pressure, this print station is transformed into a gravure station.

Preferably, second layer of adhesive 42 is made of a pressure sensitive adhesive that creates a fugitive bond between first layer of lamination 28 and second layer of lamination 42. Consequently, a permanent bond is not formed between first layer of lamination 28 and second layer of lamination 42 and first lamination layer 28 will not bear any tackiness or residue if separated from second layer of lamination 42. The second layer of lamination, which eventually forms the backer 16 of the card assembly 10, is preferably a plastic film, such as polypropylene film. However, other types of lamination having varied thickness are contemplated for use.

Upon the application of second lamination layer 42, the tag web 60 travels through a second UV lamp 73 for the marriage of all the applied materials, including first and second layers of lamination 28 and 42, respectively, to the tag stock 18. In order to cool the tag web 60 and stabilize the applied laminate films, a cold air system 92 is located just after second laminating tower 68 to blow chilled air across the tag web 60.

As previously discussed a particular feature of the present invention is the use of certain lamination films in combination with UV curable adhesives. This combination creates a strong bond of the materials, allowing the insurance card form to be fan-folded at the perforations without the risk of a premature fold at the die-cut. This feature further allows the cards to be removed from the finished forms without adhesive residue or tag stock separation.

Next, the cooled tag web 60 enters an additional print station including printing rollers 50" for the printing of further indicia on the top surface 43 of the second layer of lamination 42. The tag stock 18 is then cooled by air system 92 an additional time before entering a first die cut station 94. The cold air system 92 is a particular feature of the present invention. By stabilizing the laminate layers, the air system 92 insures that there is a stable surface on the tag stock 18 against which to die cut.

The first die cut station 94 cuts the shape of the insurance cards 14 from under the tag web 18. This cut is generally rectangular shaped and goes through the tag stock 18 and the first layer of lamination 28 and stops at the second layer of lamination 42. As previously stated, the use of the second layer of lamination 42 and the pressure sensitive adhesive layer 44 is a feature of the present invention. In particular, the second layer of lamination 42 is used as a base against which to cut during the first die cut. Further, the use of the pressure sensitive adhesive assures that the cards can be removed without accumulating any residue or tackiness.

The tag web 60 next travels to a second die cut station 96 for the formation of the backer 16. The second die cut station 96 cuts the shape of the backer 16 from above the tag web 60. This cut is also generally rectangular shaped and goes through both layers of lamination 28 and 42, respectively, and stops at the tag stock 18. Preferably, the cutting tools of both die cutting stations 94 and 96 are made of D2 steel. However, other types of tool steels typically used in die cutting stations are contemplated for use.

Figure 7:
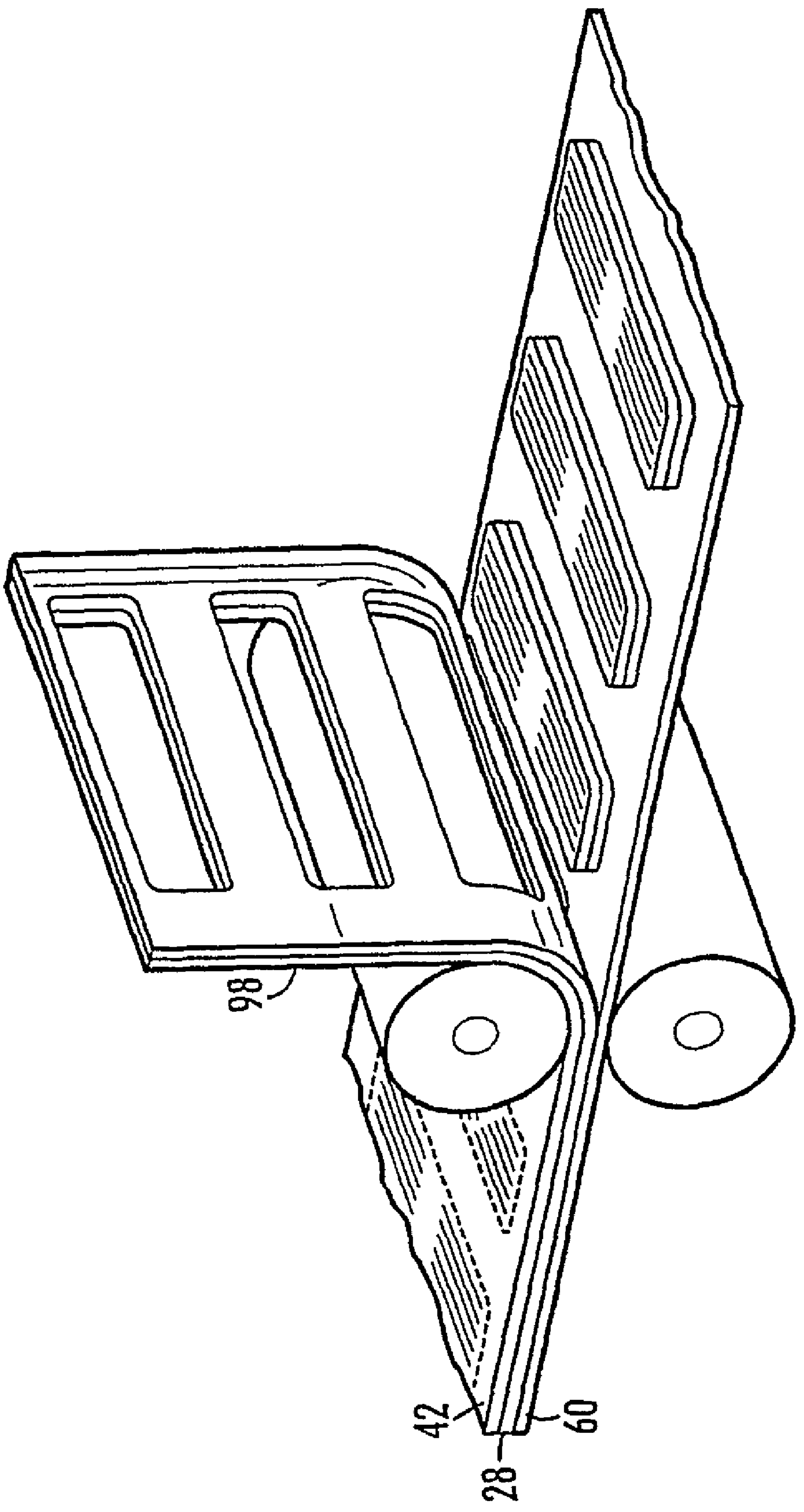
FIG. 7 is top perspective view of the waste removal system of FIG. 4, showing, in particular the removal of laminate waste from the backer of the card and business form assembly.

Because the first layer of lamination 28 is pattern coated onto tag stock 18, a matrix 98 is formed after the die cutting as illustrated in FIG. 7, which is removed, leaving the pattern on the tag stock 18. The matrix 98 is then taken to a wind up station 100 to be wound up for disposal. This matrix 98 includes both layers of lamination and layer of pressure sensitive adhesive 44.

As discussed, the use of pattern coating to apply hold out adhesive layer 26 to tag stock 18 is also a feature of the present invention. In particular, the pattern coating includes the area on the tag stock 18 that contains the backer 16. As shown, backer 16 only extends over the portion of the tag stock 18 that includes the insurance cards 14. Accordingly, after the backer 16 of the insurance card form has been die cut, waste matrix 98 is formed that includes the first and second layers of lamination 28, 42, and the layer of pressure sensitive adhesive 44. This result is advantageous because the tag stock 18 is left free from the lamination and adhesive layers. Therefore, the formation of the perforations and the feed holes 109 becomes more precise. This result is significant because the ability to fanfold the finished insurance card form, as well as to feed the form into standard printers, is greatly enhanced.

Once the backers 16 have been formed, the tag web 60 enters a male female hole punch unit 102 that cuts the printer guides 51 along the side edges of the tag stock 18. The tag web 60 next enters a rotary die cutting station 104 where the tag stock 18 is perforated at pre-selected regions. Preferably, two types of perforation blades are used including an 8 tooth per inch blade with a 40 mm gap, which is used in the position where the card form is folded, and a 10 tooth per inch blade with 32 mm gap, which is used between each fold perforation. The perforation resulting from these blades allows for both folding and separation of predetermined sections of the card assembly 10. Finally, the perforated tag web 60 is fed into a fan fold machine 106 for fan folding into the finished product.

It will be apparent to those skilled in the arts that many changes and substitutions can be made to the foregoing preferred embodiment and method without departing from the spirit and scope of the invention, which is defined by the appended claims.

What is claimed is:

1. A method for making an integrated card and business form assembly, said method comprising the following steps:
- introducing a tag web having a top surface and a bottom surface into a printing press;
- printing indicia on said tag web;
- applying a first layer of lamination on the bottom surface of said tag web using a first adhesive means;
- applying a second layer lamination over said first layer of lamination using a second adhesive means;
- cooling said tag web;
- cutting a card in said tag web; and
- cutting a backer in said tag web, wherein said cutting step includes forming a cut that extends through said second layer of lamination and said first layer of lamination without extending through said bottom surface, said backer extending over said card and extending over only a portion of said bottom surface including said surrounding border region of said tag web, said card being releasably attached to said tag web by said backer.

2. The method as recited in claim 1, further comprising the step of providing said first adhesive means made of hold out adhesive, wherein said first adhesive means forms a permanent bond between said first layer of lamination and said bottom surface of said tag web.

3. The method as recited in claim 1, further comprising the step of applying said first adhesive means through the use of pattern coating.

4. The method as recited in claim 1, further comprising the step of providing said second adhesive means made of pressure sensitive adhesive, wherein said second adhesive means forms a fugitive bond between said first layer of lamination and said second layer of lamination.

5. The method as recited in claim 1, further comprising the step of cutting said card in said tag web, wherein said cutting step includes forming a cut that extends through said top surface, said bottom surface, and said first layer of lamination without extending through said second layer of lamination, said card being co-planar with said tag web.

6. The method as recited in claim 5, wherein said tag web includes a border region that surrounds said card, said card being co-planar with said border region.

7. The method as recited in claim 1, further comprising the step of bonding said first layer of lamination to said bottom surface using UV light.

8. The method as recited in claim 1, further comprising the step of bonding said second layer of lamination to said first layer of lamination using UV light.

9. The method as recited in claim 1, further comprising the step of forming perforations on predetermined sections of said tag web.

10. A method for making an integrated card and business form assembly, said method comprising the following steps:
- introducing a tag web having a top surface and a bottom surface into a printing press;
- printing indicia on said top surface and said bottom surface of tag web;
- applying a first layer of lamination on the bottom surface of said tag web using a first adhesive means, said first adhesive means being a hold out adhesive that is applied through the use of pattern coating and that forms a permanent bond between said first layer of lamination and said bottom surface;
- bonding said first layer of lamination to said bottom surface using UV light;
- applying a second layer lamination over said first layer of lamination using a second adhesive means, said second adhesive means being a pressure sensitive adhesive that forms a fugitive bond between said first layer of lamination and said second layer of lamination;
- bonding said first layer of lamination to said second layer of lamination using UV light;
- cooling said tag web;
- cutting a card in said tag web, wherein said cutting step includes forming a cut that extends through said top surface, said bottom surface, and said first layer of lamination without extending through said second layer of lamination; and
- cutting a backer in said tag web, wherein said cutting step includes forming a cut that extends through said second layer of lamination and said first layer of lamination, without extending through said bottom surface, said backer extending over only a portion of said bottom surface of said tag web, said card being releasably attached to said tag web by said backer;
- forming a waste matrix including said first and second layers of lamination and second adhesive means;
- forming feed holes along the side edges of said tag web;
- forming perforations on predetermined sections of said tag web; and
- fan folding said perforated tag web.

* * * * *